(No Model.)
A. ALLEN.
BAKER'S OVEN.
No. 511,396. Patented Dec. 26, 1893.
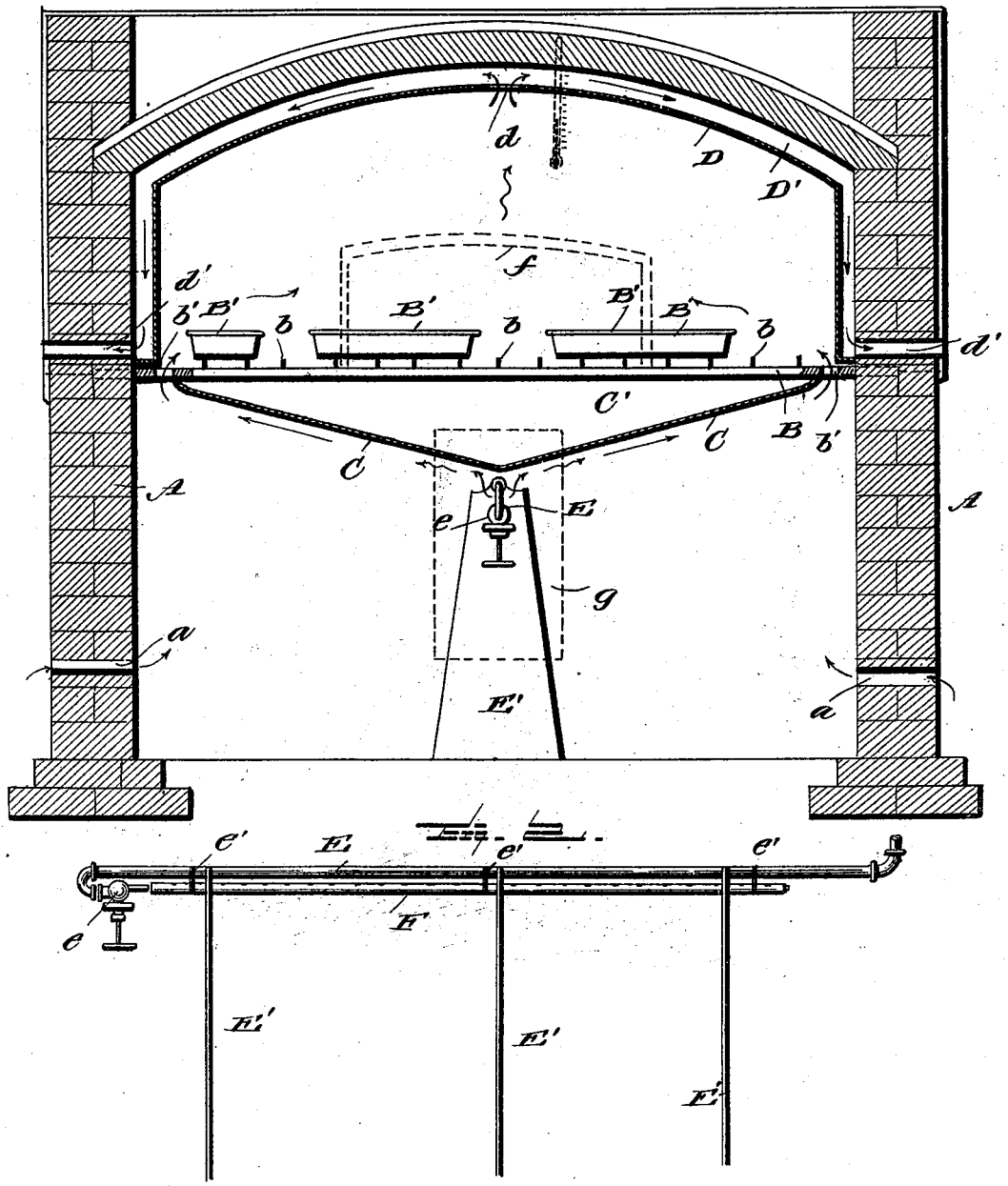
Witnesses:
L. C. Hills
E. H. Bond
Inventor:
Ambrose Allen,
by E. B. Stocking
Attorney

UNITED STATES PATENT OFFICE.

AMBROSE ALLEN, OF MEDICINE LODGE, KANSAS.

BAKER'S OVEN.

SPECIFICATION forming part of Letters Patent No. 511,396, dated December 26, 1893.

Application filed July 21, 1893. Serial No. 481,083. (No model.)

*To all whom it may concern:*

Be it known that I, AMBROSE ALLEN, a citizen of the United States, residing at Medicine Lodge, in the county of Barber, State of Kansas, have invented certain new and useful Improvements in Bakers' Ovens, of which the following is a specification, reference being had therein to the accompanying drawings.

This invention relates to certain new and useful improvements in bakers' ovens and it has for its object among others to provide a simple and cheap improved oven heated by gasoline and wherein provision is made for a perfect circulation whereby the articles baked therein will be more nutritious and not dried up no matter to what degree of heat the oven is brought to. I provide a substantially centrally-arranged gasoline heater located beneath a double inclined sheet metal shield or plate which serves to deflect the heat to opposite sides of the oven through perforations in the grate of which it is passed into the oven and out through a central outlet at the top and thence around and down the sides of the oven and out, fresh air being admitted near the bottom of the chamber in which the heater is situated. The double inclined deflector serves to prevent burning of the contents of the oven and to evenly distribute the heat throughout the same, while the chamber or hot-air compartment around the sides and top of the oven serve to keep the top and sides of the oven at the proper temperature.

Other objects and advantages of the invention will hereinafter appear and the novel features thereof will be specifically defined by the appended claims.

The invention is clearly illustrated in the accompanying drawings, which, with the letters of reference marked thereon, form a part of this specification, and in which—

Figure 1 is a vertical cross-section through my improved oven with parts shown in elevation. Fig. 2 is a side elevation of the heating device.

Like letters of reference indicate like parts in both of the views.

Referring now to the details of the drawings by letter, A designates the brick-work or outer wall of the apparatus provided with a floor A' of any suitable construction and air inlet openings $a$ at a proper distance above said floor as shown in Fig. 1.

B is the grate of the oven proper; it may be provided with the uprights $b$ as seen in Fig. 1 if desired, to keep the pans above the grate to prevent their contents burning on the bottom. The pans B' shown in Fig. 1 are shown as thus supported, but these pins or uprights may sometimes be omitted and the grate bars run lengthwise of the oven and supported at the ends only without materially affecting the other features of construction.

Beneath the grate B there is arranged a sheet metal plate C which is inclined in opposite directions from its lower central point upward toward the opposite sides of the oven, the said sheet metal plate extending from end to end of the chamber beneath the grate B of the oven proper. The opposite edges of this plate terminate a short distance from the side walls as shown in Fig. 1 at which points, that is between the edges of this plate and the side walls the grate B is provided with openings, or it may be a longitudinal slit $b'$ through which the heated air may pass from the compartment beneath said grate to that above as indicated by the arrows in Fig. 1. The double inclined sheet metal plate C forms an air chamber C' between the same and the bottom of the grate B which serves to prevent the direct contact of the heat with the pans placed on said grate as will be readily understood from Fig. 1.

The arch or roof is formed of cement and inside thereof is a sheet metal wall D which forms a hot-air chamber D' over the top and upon the sides of the oven as shown in Fig. 1, there being a central opening $d$, through which the hot air passes from the oven into this chamber, taking the course indicated by the arrows, and passing out at the bottom of said chamber through pipes or outlets $d'$ as shown which may lead to a chimney, not shown, or to any desired point, and which may be provided with dampers if desired.

The heating device is arranged centrally beneath the plate C and consists essentially of a longitudinal pipe E designed to be connected with some suitable source of supply, as a tank filled with gasoline, and provided with a valve or cock $e$ of any suitable construction. This pipe is supported in any suitable manner, as upon the uprights E', and its delivery end is arranged to deliver into a parallel perforated pipe F which is suspended from the pipe E in any suitable manner, as by the links or hangers e' as shown in Fig. 2.

Suitable openings $f$ and $g$ are provided for access to the interior of the oven and to the heating apparatus and these openings should be closed by suitable doors.

The operation will be readily understood from the foregoing description when taken in connection with the annexed drawings, and a further detailed description thereof is not deemed necessary.

What I claim as new is—

1. The improved oven herein described consisting of the surrounding brick wall with inlet openings near the bottom, the grated floor supported in said wall above said openings, the double inclined sheet metal plate beneath said floor, the heating device arranged within the compartment below said plate, the arched roof and the sheet metal wall between the roof and the grated floor and forming a hot-air chamber over the top and sides of the oven and having outlet passages at the rear ends through the surrounding walls, substantially as specified.

2. The improved oven herein described consisting of the surrounding brick wall with inlet openings near the bottom, the grated floor supported in said wall above said openings the double inclined sheet metal plate beneath said floor, the heating device arranged within the compartment below said plate, the arched roof and the sheet metal wall between the roof and the grated floor and forming a hot-air chamber over the top and sides of the oven and having outlet passages at the rear ends through the surrounding walls and the central opening through said metal wall into the hot-air chamber, substantially as specified.

3. The oven described consisting of the heating chamber with its air openings and heating device, the oven proper with its grated floor with openings at the sides, the sheet metal plate inclined in opposite directions from the center and terminating at said openings and forming a closed hot air chamber beneath the bottom of the oven proper, the arched cement roof, and the metal wall between the grated floor and the arched roof and the sides of the chamber forming a hot-air chamber around the sides and top of the oven proper with central opening in the top communicating with the interior of the oven and side outlets near the bottom, all substantially as shown and described.

In testimony whereof I affix my signature in presence of two witnesses.

AMBROSE ALLEN.

Witnesses:
W. S. BERRYMAN,
W. H. OLD.